(No Model.)
C. M. KRULL.
STOVEPIPE FASTENER.
No. 544,674. Patented Aug. 20, 1895.
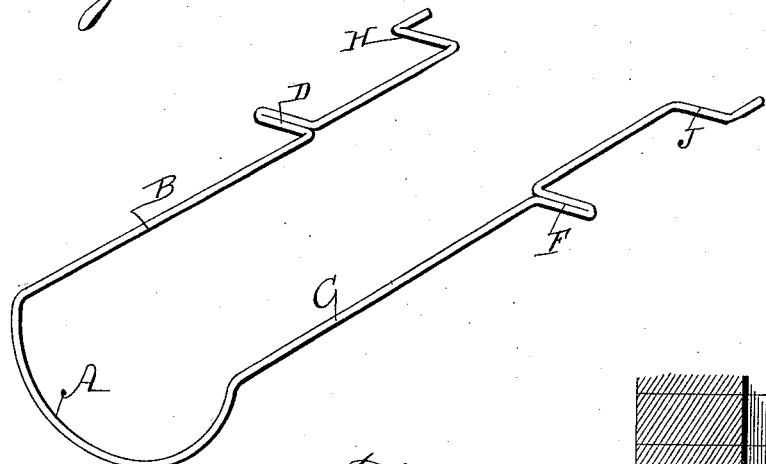
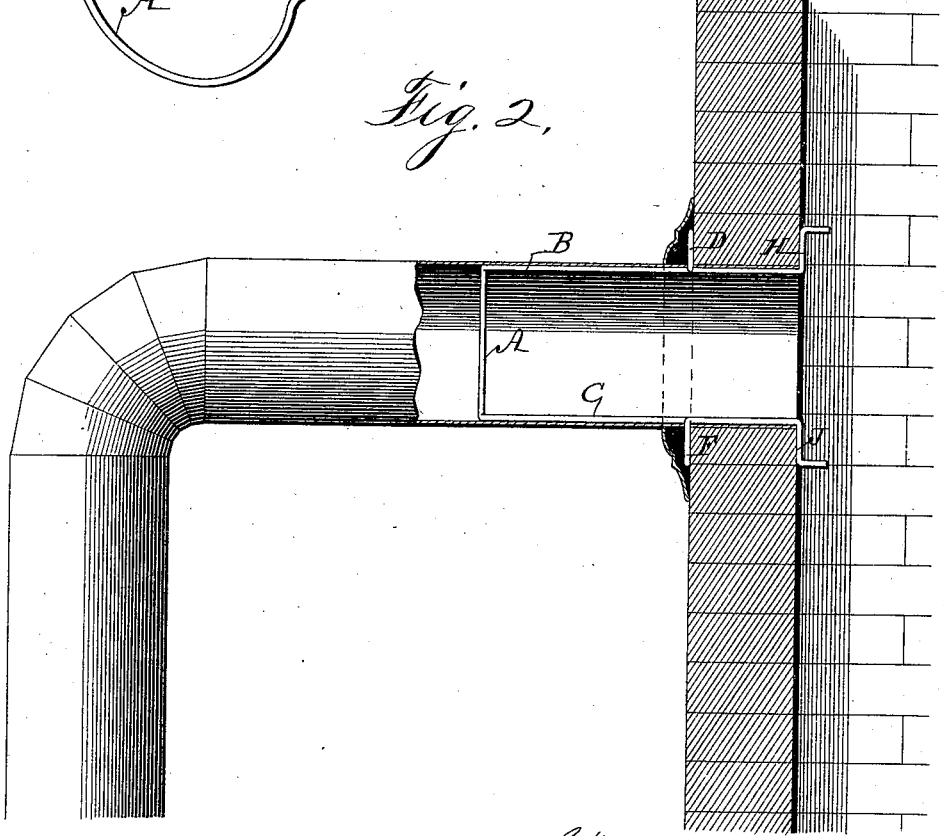

UNITED STATES PATENT OFFICE

CHARLES M. KRULL, OF DES MOINES, IOWA.

STOVEPIPE-FASTENER.

SPECIFICATION forming part of Letters Patent No. 544,674, dated August 20, 1895.

Application filed March 16, 1895. Serial No. 542,069. (No model.)

*To all whom it may concern:*

Be it known that I, CHARLES M. KRULL, a citizen of the United States of America, residing at Des Moines, in the county of Polk and State of Iowa, have invented a new and useful Stovepipe-Fastener, of which the following is a specification.

My invention consists in a simple, strong, convenient, and durable device, adapted to fit in pipes of different sizes, made of a single piece of spring-wire and detachably connected with a section of stovepipe and a chimney, as hereinafter set forth, and illustrated in the accompanying drawings, in which—

Figure 1 is a perspective view showing the device ready to be applied. Fig. 2 is a view showing a section of a chimney and the end of a stove fastened in the chimney by means of my device, as required for practical use. The end of the pipe is also shown in section and the position of the fastening device exposed to view within the pipe and the chimney.

In making my stovepipe-fastener I take a single length of spring-wire and bend it to produce a semicircle A at its center and then bend the wire at the ends of the semicircle so as to bring the end portions B and C into parallel planes that extend at right angles to the semicircle.

D and F are lateral outward projections from the parallel parts B and C, produced by doubling portions of their lengths, as clearly shown in Fig. 1, in such a manner as to adapt the projections to extend outward through perforations in a section of stovepipe, as shown in Fig. 2, and as required to securely connect the detachable fastener with a stovepipe. The extremities H and J of the parallel parts B and C are bent outward in opposite directions and adapted to engage the inside of a chimney, as shown in Fig. 2, and as required to detachably fasten a stovepipe to a chimney by means of my device. A complete device, made of a single length of wire, is thus produced without the labor and expense of riveting different flat-surfaced parts together, and that portion of the wire that comes in contact with the inside surface of a stovepipe will not rust and fasten to the pipe and cause the pipe to be damaged as readily as when a sheet metal and flat-surfaced device is inserted in a pipe for the purpose of fastening the pipe to a chimney.

To connect the fastener with a stovepipe holes are made in the pipe at such points as will allow the projections D and F to enter them, and also allows the ends H and J to engage the inside face of the wall of a chimney, as shown in Fig. 2. By pressing the free-end portions of the parallel parts B and C toward each other, the semicircle A can be passed in through the open end of the pipe far enough to allow the projections D and F to enter the holes made therefor in the pipe, so that when pressure upon the free ends is relaxed said projections will, by means of the power stored in the parallel parts, be forced outward through the holes in the pipe; and when the fastener is thus adjustably and detachably connected with the pipe the pipe and fastener can be readily detachably connected with a chimney by simply bringing the free ends of the fastener toward each other close enough to allow the extremities H and J to be passed through the stovepipe-hole of the chimney, and this is readily effected by pressing inward on the projections D and F, and after the parts H and J are close enough together to pass them B and the pipe inward through the hole in the chimney and then allowing the parallel parts and C to resume their normal positions, and by so doing cause the outwardly-bent free-end portions to clasp the inside of the chimney-wall. To remove the pipe from the chimney the projections D and F need but be pressed inward sufficiently to disengage the free ends H and J from the chimney, so that the pipe and fastener can be jointly drawn out of the chimney-hole.

It is obvious my device can be advantageously made by means of a suitable machine, so that the cost of manufacture will be nominal. It is also obvious that the diameter of the semicircle may vary to suit pipes of different sizes, and that it need not be extended at right angles to the parallel parts, and that the distance between the lateral projections D and F and the outwardly-bent free end H and J must vary to suit the thicknesses of the walls of chimneys. It is also obvious that the semicircular bend A of the spring-wire is free to contract and expand, so that when it is larger in diameter than the pipe into which it is passed, and as contemplated, it will by its expansive force adhere firmly to the inside surface of the pipe, as required, to be securely retained in the proper position relative to the perforations in the pipe through which the projections D and F must pass in and out as the parallel parts B and C and H and J are operated relative to the pipe and a chimney.

By placing a collar K on the stovepipe and against the chimney, as shown in Fig. 2, the fastener will be entirely concealed.

I claim as my invention—

A stove pipe fastener consisting of a single piece of spring wire bent into semicircular form at its center to engage the inside surface of a pipe in the manner set forth and the end portions of the wire extended at right angles and in parallel planes from said semicircular central part, lateral outward projections D and F formed on said end portions by doubling parts thereof, and elbow-shaped terminals of the wire projecting outward, substantially as shown and described.

CHARLES M. KRULL.

Witnesses:
REUBEN G. ORWIG,
THOMAS G. ORWIG.